3,301,914
PRODUCTION OF ACETYLENE, OR ACETYLENE AND ETHYLENE, BY PARTIAL OXIDATION OF HYDROCARBONS
Willi Danz, Ludwigshafen (Rhine), and Walter Teltschik, Frankenthal, Pfalz, Germany, assignors to Badische Anilin- & Soda-Fabrik Aktiengesellschaft, Ludwigshafen (Rhine), Germany
No Drawing. Filed Jan. 8, 1963, Ser. No. 249,996
Claims priority, application Germany, Jan. 12, 1962, B 65,498
6 Claims. (Cl. 260—679)

This invention relates to a process for the production of acetylene, or acetylene and ethylene, by partial oxidation of hydrocarbons with oxygen or oxygen-containing gases.

More specifically, it relates to the preheating of hydrocarbons having relatively high molecular weights prior to their entry into the reaction chamber after having been mixed with preheated oxygen or oxygen-containing gases.

It is known to convert hydrocarbons or mixtures containing hydrocarbons by partial oxidation into cracked gas containing acetylene by heating up the hydrocarbon and oxygen in separate preheaters to the highest possible temperatures, mixing them in a suitable mixer and introducing the mixture through a gas distributing block into the reaction chamber. In the reaction chamber, or burner, part of the hydrocarbon is burnt in a flame reaction with oxygen; by this reaction the heat and temperature are produced which are required to crack the remainder of the hydrocarbon to acetylene. At the end of the reaction chamber, the hot flame gas is quenched with a cooling liquid.

It is also known to produce ethylene in addition to acetylene in the above-mentioned way by the introduction of additional hydrocarbon into the reaction chamber. The additional hydrocarbon is preferably introduced in gaseous or liquid form through nozzles arranged radially, tangentially or axially with respect to the direction of flow of the hot flame gas.

When methane or natural gas is used as the hydrocarbon to be cracked, the hydrocarbon and oxygen are heated up in suitable preheaters to 600° C. or more and the hot gases are led into a mixer in which they are intimately mixed. The hot reactive mixture is then passed into the reaction chamber.

It is also known to use higher hydrocarbons or a mixture of higher hydrocarbons, for example light naphtha, instead of methane or natural gas. For this purpose the mixing chamber is adapted on the inlet side to the changed flow conditions in order to ensure intimate mixing of the hydrocarbon with the oxygen. The mixture of hydrocarbon and oxygen thereby becomes so reactive that at preheating temperatures of 600° C. preignition takes place in the mixing chamber. It is therefore necessary, for stationary operation of the burner, to maintain lower preheating temperatures depending on the type of hydrocarbon used, for example as low as 350° C. when using light naphtha. The residence period of the reactive mixture on its path from the mixing side to the gas distributing block is about 0.1 to 0.3 second. (This, and other residence periods and gas speeds mentioned hereinafter relate to the conditions at 0° C. and 760 mm. Hg.)

We have now fuond that in the production of acetylene, or of acetylene and ethylene, by partial oxidation of hydrocarbons with oxygen or oxygen-containing gases, it is also possible to preheat higher hydrocarbons having up to 10 carbon atoms in the molecule, for example light naphtha, to 600° C. or more without the occurrence of preignition by maintaining the residence period of the mixture of hydrocarbon and oxygen in the mixer at less than 0.1 second and maintaining the velocity of this gas mixture immediately prior to its entry into the channels in the gas distributing block at more than 5 meters per second, preferably at more than 10 meters per second.

This process has a number of advantages over the methods hitherto known. Firstly, preheating to such a high temperature, which is made possible by the short residence period in the mixer in accordance with the invention, has the effect on the composition of the gas to be supplied to the mixer that as compared with the prior art methods less oxygen is required for the reaction of the same amount of hydrocarbon.

The cracked gas also differs in its composition from the prior art proportions: the proportion of the desired hydrogen-containing components in the cracked gas, for example acetylene or hydrogen, increases, whereas the proportion of the two undesired oxygen-containing components, carbon monoxide and carbon dioxide, decreases. The increase in acetylene is 10% and more of the value hitherto attainable. The decrease in carbon dioxide is particularly marked, and may be more than 25%; this is of particular advantage because carbon dioxide makes the recovery of acetylene difficult. The said displacement in the composition of the cracked gas thus results in a considerable simplication in the acetylene processing plant. The possibility of a higher preheating temperature for the gas supplied to the mixer moreover permits a marked increase in the proportion of hydrogen to carbon monoxide in the cracked gas and this also favorably affects the further processing of the cracked gas.

The process according to this invention makes possible a decrease in the consumption of hydrocarbon of up to 10% and in the oxygen consumption of up to 20% in the production of acetylene, as compared with prior art consumptions.

Where the shape and size of the gas distributor block are predetermined, the short residence preiod of the reactive gas mixture in the mixer according to this invention may be achieved by decreasing the size of the mixer and/or by increasing the throughput. The throughput is limited by the maximum possible gas velocity in the channels of the gas distributing block. If this velocity is exceeded, the reaction flame forms unsatisfactorily or not at all at the rear face of the gas distributing block.

The process permits an increase in the throughput through a given apparatus with a given gas distributor, because the gas velocity in the channels of the block can be increased from the conventional gas velocities of about 20 to 30 meters per second to more than 40 meters per second without difficulty and without the flame becoming detached. In view of the fact that when using higher hydrocarbons instead of methane or natural gas, the gas volume of the mixture of hydrocarbon and oxygen is less owing to the higher density of the hydrocarbon, there is not only an increase in throughput resulting from the shortening of the residence period, but also an increase in the throughput due to the higher density of the higher hydrocarbon.

By the said measures, namely the shortening of the residence period of the reactive gas mixture in the mixer and increase in the throughput rate in the channels of the gas distributor block when using higher hydrocarbons instead of methane or natural gas, not only are the running costs lowered considerably but the size of burner required for a given acetylene production is less.

A further improvement in the process may be achieved by adding hydrogen or hydrogen-containing gases to the hydrocarbon or hydrocarbon mixture to be cracked because in this way the production of carbon black is greatly diminished. For example if the hydrocarbon is mixed with hydrogen in the volumetric ratio 1:1, the occurrence of carbon black falls to one third of its original value.

Consumption of hydrocarbon per kilogram of acetylene also falls off, whereas the acetylene content of the cracked gas is only slightly less than when cracking hydrocarbons preheated to the same preheating temperature but without added hydrogen.

The residual gas rich in hydrogen which is necessarily obtained in the acetylene concentration plant is available in practice for the process according to this invention. This gas contains, besides hydrogen as the main component, carbon monoxide and some methane and carbon dioxide. Thus a cheap gas at sufficiently high pressure is available because the small amount of impurities is not troublesome.

The invention is illustrated by, but not limited to, Examples 3, 4 and 5. The advantages of the invention will be apparent from a comparison with the data given in Examples 1 and 2.

*Example 1*

Light naphtha having the boiling range 30° to 110° C. and oxygen are preheated separately in two separate preheaters, mixed in a mixer and passed through a gas distributing block into the reaction chamber. The residence period of the gas mixture in the mixer is 0.17 second, and the maximum preheating temperature of the gas at which the burner can be operated without preignition is 350° C. The velocity of the gas mixture immediately prior to its entry into the channels of the gas distributing block is 7 meters per second. The velocity of the gas mixture in the channels of the gas distributing block is 17 meters per second.

The cracked gas obtained contains 10.0% by volume of acetylene and 4.0% by volume of carbon dioxide. The ratio by volume of hydrogen to carbon monoxide in the cracked gas is 1.14:1. The consumption of light naphtha per kilogram of acetylene is 4.0 kilograms, the oxygen consumption per kilogram of acetylene 4.2 kilograms. 20 g. of carbon black forms for each cubic meter (S.T.P.) of cracked gas.

*Example 2*

Light naphtha having the boiling range 30° to 110° C. and oxygen are preheated in two separate preheaters, mixed in a preheater and passed into the reaction chamber under the same conditions as in Example 1. Light naphtha of the boiling range 30° to 110° C. is additionally introduced into the reaction chamber radially to the direction of flow of the hot flame gas. The cracked gas contains 8.5% by volume of acetylene, 6.2% by volume of ethylene and 3.8% by volume of carbon dioxide. The ratio of hydrogen to carbon monoxide in the cracked gas is 1.14:1. 3.0 kilograms of light naphtha and 1.9 kilograms of oxygen are used up for each kilogram of unsaturated $C_2$-compounds (acetylene and ethylene).

*Example 3*

Light naphtha having the boiling range 30° to 110° C. and oxygen are preheated separately in two separate preheaters and supplied through a mixer to the gas distributing block. The residence period of the gas mixture in the mixer is 0.025 second, and the preheating temperature is 600° C. The velocity of the gas mixture immediately prior to its entry into the channels of the gas distributing block is 22 meters per second. The velocity flow of the gas mixture in the channels of the gas distributing block is 52 meters per second. The cracked gas contains 11.0% by volume of acetylene and 3.1% by volume of carbon dioxide; the ratio of hydrogen to carbon monoxide in the cracked gas is 1.22:1. 3.7 kilograms of light naphtha and 3.6 kilograms of oxygen are required for each kilogram of acetylene.

*Example 4*

Light naphtha having the boiling range 30° to 110° C. and oxygen are preheated separately in two separate preheaters, mixed in a mixer and passed into the reaction chamber under the same conditions as in Example 3. Light naphtha having the boiling range 30° to 110° C. is additionally introduced into the reaction chamber under the same conditions as in Example 2. The cracked gas contains 9.4% by volume of acetylene, 6.8% by volume of ethylene and 3.0% by volume of carbon dioxide. The ratio of hydrogen to carbon monoxide in the cracked gas is 1.20:1. 2.8 kilograms of light naphtha and 1.7 kilograms of oxygen are used up for each kilogram of unsaturated $C_2$-compounds (acetylene and ethylene).

*Example 5*

Residual gas from the concentration of acetylene is added to light naphtha having the boiling range 30° to 110° C. in the volumetric ratio 1:1. This residual gas contains 48% of hydrogen, 41.5% of carbon monoxide, 4.5% of methane, 6% of carbon dioxide, nitrogen and argon. The mixture of light naphtha and residual gas and oxygen are preheated in separate preheaters to 600° C., mixed and passed through a gas distributing block into the reaction chamber. The residence period in the mixer is 0.04 second. The velocity of the gas mixture immediately prior to its entry into the channels of the gas distributing block is 12 meters per second. The rate of flow in the channels in the gas distributing block is 32 meters per second. The cracked gas obtained contains 10.5% by volume of acetylene. The consumption of gasoline is 3.5 kilograms for each kilogram of acetylene and the consumption of oxygen for each kilogram of acetylene is 4.0 kilograms. 9 g. of carbon black forms for each cubic meter (S.T.P.) of cracked gas.

We claim:

1. A process for the production of acetylene which comprises: separately preheating a hydrocarbon higher than methane and having up to 10 carbon atoms and oxygen, said hydrocarbon being preheated to a temperature greater than 350° C., mixing the preheated materials intimately in a mixer, maintaining the residence period of said mixture of hydrocarbon and oxygen in said mixer at less than 0.1 second, whereby no preignition of said hydrocarbon takes place in said mixer, passing the gas mixture through the channels of a gas distributing block into a reaction chamber, maintaining the velocity of said gas mixture immediately prior to its entry into the channels of said gas distributing block at more than 5 meters per second, burning part of the hydrocarbon and cracking the remainder of the hydrocarbon in said reaction chamber, and immediately quenching the reaction product and thereafter recovering said acetylene.

2. A process as in claim 1 wherein an additional amount of said hydrocarbon is introduced into the reaction chamber radially to the direction of flow of the hot flame gas in the reaction chamber, whereby both acetylene and ethylene are formed in the process.

3. The process of claim 1 wherein said hydrocarbon is a light naphtha.

4. A process for the production of acetylene which comprises: separately preheating a hydrocarbon higher than methane and having up to 10 carbon atoms and oxygen, said hydrocarbon being preheated to a temperature of at least about 600° C., mixing the preheated materials intimately in a mixer, maintaining the residence period of said mixture of hydrocarbon and oxygen in said mixer at less than 0.1 second, whereby no preignition of said hydrocarbon takes place in said mixer, passing the gas mixture through the channels of a gas distributing block into a reaction chamber, maintaining the velocity of said gas mixture immediately prior to its entry into the channels of said gas distributing block at more than 10 meters per second, maintaining the velocity of said gas mixture in said channels at more than 20 meters per second, burning part of the hydrocarbon and cracking the remainder of the hydrocarbon in said reaction chamber, and immediately quenching the reaction product and thereafter recovering said acetylene.

5. A process for the production of acetylene which comprises: adding hydrogen to a hydrocarbon higher than methane and having up to 10 carbon atoms, and thereafter separately preheating said hydrocarbon and oxygen, said hydrocarbon being preheated to a temperature greater than 350° C., mixing the preheated materials intimately in a mixer, maintaining the residence period of said mixture of hydrocarbon and oxygen in said mixer at less than 0.1 second, whereby no preignition of said hydrocarbon takes place in said mixer, passing the gas mixture through the channels of a gas distributing block into a reaction chamber, maintaining the velocity of said gas mixture immediately prior to its entry into the channels of said gas distributing block at more than 5 meters per second, burning part of the hydrocarbon and cracking the remainder of the hydrocarbon in said reaction chamber, and immediately quenching the reaction product and thereafter recovering said acetylene.

6. A process for the production of acetylene which comprises: adding residual gas obtained in the concentration of acetylene to a hydrocarbon higher than methane and having up to 10 carbon atoms, and thereafter separately preheating said hydrocarbon and oxygen, said hydrocarbon being preheated to a temperature greater than 350° C., mixing the preheated materials intimately in a mixer, maintaining the residence period of said mixture of hydrocarbon and oxygen in said mixer at less than 0.1 second, whereby no preignition of said hydrocarbon takes place in said mixer, passing the gas mixture through the channels of a gas distributing block into a reaction chamber, maintaining the velocity of said gas mixture immediately prior to its entry into the channels of said gas distributing block at more than 5 meters per second, burning part of the hydrocarbon and cracking the remainder of the hydrocarbon in said reaction chamber, and immediately quenching the reaction product and thereafter recovering said acetylene.

References Cited by the Examiner

UNITED STATES PATENTS

| | | | |
|---|---|---|---|
| 2,679,534 | 5/1954 | Dorsey | 260—679 |
| 2,833,839 | 5/1958 | Lehrer | 260—679 |
| 2,838,584 | 6/1958 | Tsutsumi et al. | 260—679 |
| 3,178,488 | 4/1965 | Akin | 260—679 |

OTHER REFERENCES

Kunugi et al., "Chem. Engr. Progress," November 1961, vol. 57, No. 11, pp. 43–49.

ALPHONSO D. SULLIVAN, *Primary Examiner.*